(12) United States Patent
Shin et al.

(10) Patent No.: US 9,976,046 B2
(45) Date of Patent: May 22, 2018

(54) COLOR COATING COMPOSITION FOR LED LAMP DIFFUSER USING GLASS FRITS AND COLOR-COATED GLASS ARTICLE USING THE SAME

(71) Applicant: SHINCERAMIC CO., LTD., Gyeonggi-do (KR)

(72) Inventors: Jae Soo Shin, Gyeonggi-do (KR); Hyeon Bae, Gyeonggi-do (KR); Hee Chul Shin, Gyeonggi-do (KR); Je Hune Chang, Gyeonggi-do (KR); Seung Pyo Hong, Gyeonggi-do (KR)

(73) Assignee: SHINCERAMIC CO., LTD., Gyeonggi-do (KR)

( * ) Notice: Subject to any disclaimer, the term of this patent is extended or adjusted under 35 U.S.C. 154(b) by 406 days.

(21) Appl. No.: 14/727,802

(22) Filed: Jun. 1, 2015

(65) Prior Publication Data
US 2015/0344719 A1 Dec. 3, 2015

(30) Foreign Application Priority Data

May 30, 2014 (KR) .................. 10-2014-0065821

(51) Int. Cl.
*C09D 133/00* (2006.01)
*C09D 101/18* (2006.01)
(Continued)

(52) U.S. Cl.
CPC .............. *C09D 133/00* (2013.01); *C08K 3/16* (2013.01); *C08K 3/20* (2013.01); *C08K 3/22* (2013.01);
(Continued)

(58) Field of Classification Search
CPC .... C09D 11/08; C09D 11/102; C09D 133/00; C09D 133/06; C09D 101/18;
(Continued)

(56) References Cited

U.S. PATENT DOCUMENTS 6,147,019 A * 11/2000 Donohue .................. C03C 3/15
501/50
6,217,821 B1 * 4/2001 Donohue ................. H01B 1/16
156/89.16
(Continued)

FOREIGN PATENT DOCUMENTS

JP 2009-032563 A 2/2009
KR 10-2008-0005904 A 1/2008
(Continued)

OTHER PUBLICATIONS

English translation of KR 2011-0064760, Jun. 2011; 10 pages.*
(Continued)

*Primary Examiner* — Helene Klemanski
(74) *Attorney, Agent, or Firm* — IP Legal Services, LLC

(57) ABSTRACT

Disclosed herein are a color coating composition for an LED lamp diffuser using glass frits and a color-coated glass article using the same. The color coating composition is capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency.

20 Claims, 5 Drawing Sheets
(1 of 5 Drawing Sheet(s) Filed in Color)

(51) Int. Cl.

| | | |
|---|---|---|
| *C09D 101/28* | (2006.01) | |
| *C09D 133/06* | (2006.01) | |
| *C08K 3/16* | (2006.01) | |
| *C08K 3/20* | (2006.01) | |
| *C08K 3/22* | (2006.01) | |
| *C08K 3/26* | (2006.01) | |
| *C09D 11/08* | (2006.01) | |
| *C09D 11/102* | (2014.01) | |
| *F21K 9/60* | (2016.01) | |
| *F21K 9/23* | (2016.01) | |
| *F21K 9/27* | (2016.01) | |
| *F21Y 115/10* | (2016.01) | |
| *F21K 9/66* | (2016.01) | |

(52) U.S. Cl.
CPC .............. *C08K 3/26* (2013.01); *C09D 101/18* (2013.01); *C09D 101/28* (2013.01); *F21K 9/60* (2016.08); *C08K 2003/162* (2013.01); *C08K 2003/222* (2013.01); *C08K 2003/2206* (2013.01); *C08K 2003/2227* (2013.01); *C08K 2003/2241* (2013.01); *C08K 2003/2296* (2013.01); *C08K 2003/265* (2013.01); *C09D 133/06* (2013.01); *F21K 9/23* (2016.08); *F21K 9/27* (2016.08); *F21K 9/66* (2016.08); *F21Y 2115/10* (2016.08)

(58) Field of Classification Search
CPC .......... C09D 101/28; C08K 3/16; C08K 3/20; C08K 3/22; C08K 3/26; C08K 2003/162; C08K 2003/2206; C08K 2003/222; C08K 2003/2227; C08K 2003/2241; C08K 2003/2296; C08K 2003/265; F21Y 2115/10
USPC ......... 106/31.95, 31.05, 31.69, 31.85, 31.86, 106/31.9
See application file for complete search history.

(56) References Cited

U.S. PATENT DOCUMENTS

| | | | |
|---|---|---|---|
| 9,640,674 B2* | 5/2017 | Park ...................... | H01B 1/16 |
| 2007/0057364 A1 | 3/2007 | Wang et al. | |
| 2008/0090034 A1* | 4/2008 | Harrison ............... | C09D 11/322 |
| | | | 106/31.13 |
| 2008/0210122 A1* | 9/2008 | Magdassi ............... | C09D 11/30 |
| | | | 106/31.05 |
| 2009/0027895 A1 | 1/2009 | Daimon et al. | |
| 2009/0039781 A1* | 2/2009 | Ito .......................... | H01J 9/02 |
| | | | 313/582 |
| 2009/0278162 A1 | 11/2009 | Wang et al. | |
| 2010/0086771 A1* | 4/2010 | Nageno ................... | C03C 3/089 |
| | | | 428/332 |
| 2012/0113650 A1* | 5/2012 | Inoue .................. | C04B 41/5022 |
| | | | 362/296.02 |
| 2012/0155093 A1 | 6/2012 | Yamada et al. | |
| 2015/0325715 A1* | 11/2015 | Sun ................. | H01L 31/022425 |
| | | | 136/256 |
| 2015/0344736 A1* | 12/2015 | Shin ..................... | C09D 183/08 |
| | | | 362/217.02 |

FOREIGN PATENT DOCUMENTS

| | | |
|---|---|---|
| KR | 10-2011-0064760 A | 6/2011 |
| KR | 10-2012-0069509 A | 6/2012 |

OTHER PUBLICATIONS

Pigment Red 108, no date available; 2 pages.*
Pigment Green 50, no date available; 1 page.*
Pigment Blue 28, no date available; 2 pages.*
Cadmium Zinc Sulfide Pigment, National Center for Biotechnology Information; PubChem Compound Database; CID=44181, https://pubchem.ncbi.nlm.nih.gov/compound/44181, no date available; 12 pages.*

* cited by examiner

COLOR COATING COMPOSITION FOR LED LAMP DIFFUSER USING GLASS FRITS AND COLOR-COATED GLASS ARTICLE USING THE SAME

CROSS-REFERENCE TO PRIOR APPLICATION

The present application claims priority under 35 U.S.C. § 119 to Korean Patent Application No. 10-2014-0065821 (filed on May 30, 2014).

BACKGROUND OF THE INVENTION

Field of the Invention

The present invention relates to a color coating composition for an LED lamp diffuser using glass frits and a color-coated glass article using the same, and more particularly, to a color coating composition for an LED lamp diffuser, capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency, and a color-coated glass article using the same.

Description of the Related Art

Lamps are used for various purposes such as decoration and visual display in addition to a lighting purpose for lighting darkness. Lamps such as incandescent lamps or fluorescent lamps using filaments have been mainly used until now. However, since most of power consumption is released as heat in the lamps, energy used for actual lighting is only 5 to 30% of the used power. For this reason, the lamps have low energy efficiency and a short service life.

Accordingly, an LED lamp using an LED having low power consumption and a long service life is recently spotlighted. In general, the LED lamp may have reduced energy consumption of ⅕ or less compared to the incandescent lamp or of ⅓ or less compared to the fluorescent lamp, and have an increased life more than 100 times that of the incandescent lamp or more than 10 times that of the fluorescent lamp. The LED lamp which is currently released as a product is generally manufactured to have an external appearance similar to the conventional lamp such as the incandescent lamp or the fluorescent lamp so as to be used as it is in an existing lighting fixture. For example, a fluorescent lamp type LED lamp is shown in FIG. 1.

As shown in the drawing, a conventional LED lamp has a structure in which a substrate 20 having a plurality of LEDs 21 is disposed inside a main body 10 and a cover 30 is coupled to the main body 10 so as to cover the front of the LEDs 21. Connection pins for supplying power to the LEDs 21 are provided at both sides of the main body 10, and thus the LED lamp may be connected to a fluorescent lighting fixture in a manner similar to an existing fluorescent lamp and be used.

Since each LED is generally a point light source, the LED lamp requires a diffuser for broadly diffusing light of the LED in order to prevent glare and provide uniform lighting. For this reason, the cover 30 serves as a diffuser 30 which is made of synthetic resin having light diffusivity so as to be bloomed by adding a dispersing agent to PC (polycarbonate) instead of a simple light transmission material.

In addition, since the LED is weak to heat, performance of the LED is rapidly deteriorated when the LED is used at a temperature greater than an optimal temperature. Accordingly, there is a need for a heat sink capable of rapidly dissipating heat generated when the LED is actuated. Although the LED has improved heat resistance and reduced operating heat according to technical development, heat may not be effectively radiated through the diffuser 30 made of synthetic resin. Therefore, the conventional LED lamp necessarily requires the heat sink. In addition, the heat sink may be further required since the diffuser 30 itself is very weak to heat. Thus, the main body 10 serves as a heat sink 10 made of a metal material such as aluminum.

As described above, the conventional LED lamp has a structure in which the synthetic resin-made diffuser 30 is coupled to the metal-made heat sink 10.

However, since the diffuser 30 is made of synthetic resin which is weak to heat and light (particularly, ultraviolet light), the diffuser 30 is deformed and discolored and has poor strength and light transmittance due to heat and light generated during operation of the LEDs 21 and due to solar heat/sunlight radiated according to an installation environment and heat and light applied from the surroundings. For this reason, a lighting quality and an external appearance of the conventional LED lamp are deteriorated for a short time and the LED lamp has a short service life due to poor durability.

In addition, since the conventional LED lamp has a structure in which the heat sink 10 and the diffuser 30 are separately manufactured and assembled to each other and particularly the heat sink 10 is made of a metal material requiring a considerable material and processing cost, there is a problem in that productivity is lowered and manufacturing cost is high.

Although not separately illustrated, a bulb type and other types of LED lamps are a structure in which a metal-made heat sink is coupled to a synthetic resin-made diffuser. Therefore, the LED lamps also have the above-mentioned problems.

SUMMARY OF THE INVENTION

Accordingly, the present invention is directed to a color coating composition for an LED lamp diffuser using glass frits and a color-coated glass article using the same that substantially obviate one or more problems due to limitations and disadvantages of the related art.

An object of the present invention is to provide a color coating composition for an LED lamp diffuser using glass frits, capable of increasing durability and a life of an LED lamp, satisfactorily maintaining an external appearance and a lighting quality thereof for a long time, and realizing various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency, and a color-coated glass article using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an aspect of the present invention, a color coating composition for an LED lamp diffuser includes a binder solution, glass frits, ceramic filler, and an inorganic pigment in a specified composition.

The color coating composition may comprise 50 wt % of a binder solution, 40 wt % to 44 wt % of glass frits, 5 wt % to 8 wt % of ceramic filler, and 1 wt % to 3 wt % of an inorganic pigment.

The inorganic pigment may comprise any one selected from the group including C.I. Pigment Red 108, Cadmium zinc sulfide, C.I. Pigment Green 50, and C.I. Pigment Blue 28.

The inorganic pigment may have a content of 1 wt % to 5 wt %.

The binder solution is composed of an organic binder and a solvent, wherein the organic binder comprises any one selected from the group including nitrocellulose, acrylic resin, and ethyl cellulose, and wherein the solvent comprises one or more components selected from the group including toluene, acetone, isobutylacetate, butyl cellosolve, and xylene.

The glass frits mainly comprise silicon dioxide, boron oxide, zinc oxide, and barium oxide.

The glass frits mainly comprise 9 wt % to 17 wt % of silicon dioxide, 18 wt % to 20 wt % of boron oxide, 41 wt % to 46 wt % of zinc oxide, and 9 wt % to 17 wt % of barium oxide.

The glass frits further comprise 1 wt % to 11 wt % of one or more components selected from the group including potassium oxide, sodium oxide, and aluminum oxide.

The ceramic filler comprises one selected from the group including calcium carbonate, calcium oxide, calcium fluoride, titanium dioxide, silica dioxide, zinc oxide, aluminum oxide, and magnesium oxide.

The ceramic filler has a content of 8 wt % to 12 wt % according to a composition ratio of the glass frits.

In another aspect of the present invention, a method of manufacturing a color coating composition includes: (1) forming glass frits in the form of powders; (2) mixing glass frits, ceramic filler, and an inorganic pigment in a specified composition in an organic binder solution; and (3) forming a coating solution by stirring a mixed solution obtained from the stage (2) while pulverizing the mixture.

The stage (3) is carried out in a ball mill provided in a mixer.

The stage (3) is carried out for 30 minutes in a ball mill provided in a mixer such that the particle size of the ceramic filler becomes 2 μm to 4 μm.

The stage (1) includes mixing a glass frit source in a specified composition to form a mixed source, fusing the mixed source using a fusing crucible, clarifying and cooling the fused mixed source, and wet-pulverizing the glass obtained from the clarifying and cooling processes.

The fusing stage is carried out at 1200° C. for 30 minutes and the wet-pulverization stage is performed such that the particle size of the glass frits becomes 2 μm to 4 μm.

In an aspect of the present invention, a color-coated glass article is coated with a color coating composition for an LED lamp diffuser, wherein the color coating composition is coated in a thickness ranging from 10 μm to 20 μm.

The color-coated glass article is formed by increasing ambient temperature by 5° C. a minute and respectively holding the temperature conditions for 5 minutes from room temperature to 500° C. to 600° C. followed by a cooling and curing process.

As is apparent from the above description, the present invention may increase durability and a life of an LED lamp, satisfactorily maintain an external appearance and a lighting quality thereof for a long time, and realize various colors, by manufacturing a glass-made diffuser as a means for diffusing light of the LED lamp in a manner of coating the diffuser on various sheets of transparent or translucent glass such as tubes and bulbs so that the diffuser is not deformed and discolored due to light and heat, and has high strength and translucency.

It is to be understood that both the foregoing general description and the following detailed description of the present invention are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF EMBODIMENTS

Figure 1:
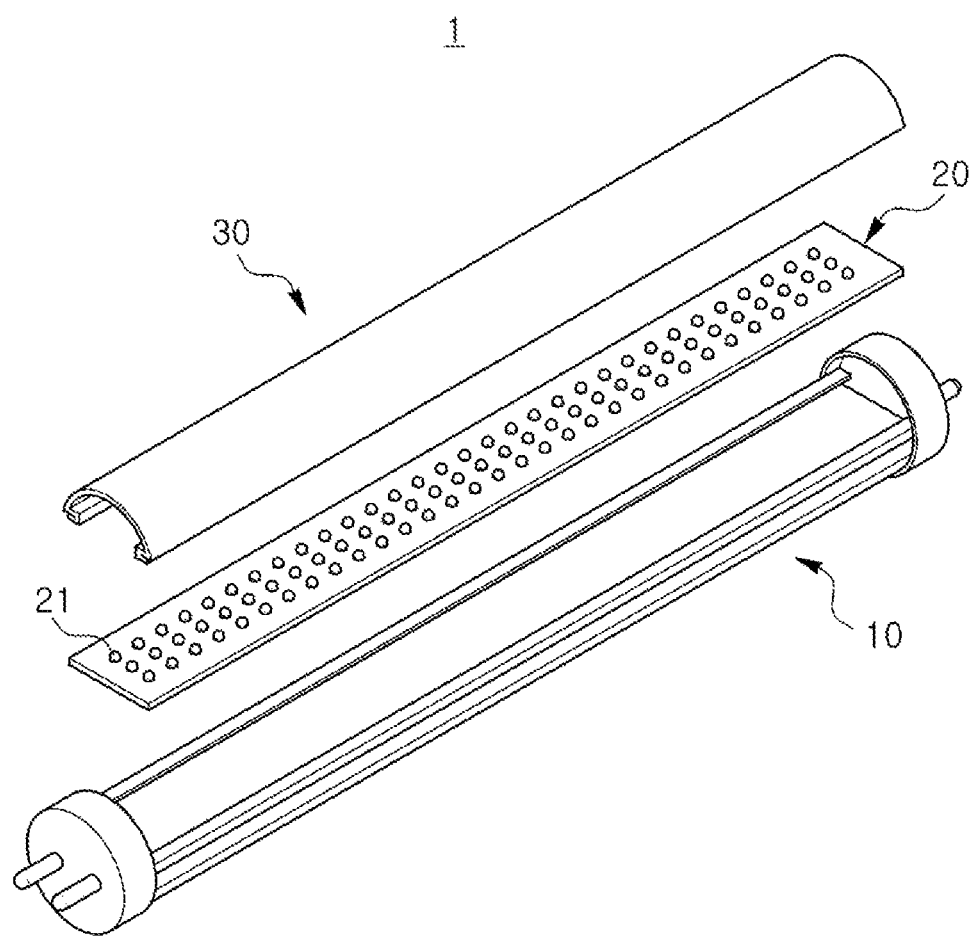
FIG. 1 is a view illustrating a conventional LED lamp.

Exemplary embodiments of the present invention will be described below in more detail with reference to the accompanying drawings.

It should be understood that the following specific structural and functional descriptions are merely examples given for the purpose of providing a description of the exemplary embodiments according to the concept of the present invention. Accordingly, various variations may be performed on the exemplary embodiments of the present invention, and it should be understood that the scope and spirit of the present invention will not be limited only to the exemplary embodiments presented in the description of the present invention set forth herein.

Since various variations may be performed on the exemplary embodiments according to the concept of the present invention and the embodiments of the present invention can be realized in a wide range of varied forms, specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

Furthermore, the terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Other expressions for describing relationships between elements, for example, "between" and "immediately between" or "neighboring" and "directly neighboring" may also be understood likewise.

The terminology used in the specification of the present invention is for the purpose of describing particular embodiments only and is not intended to limit the invention. As used in the specification and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
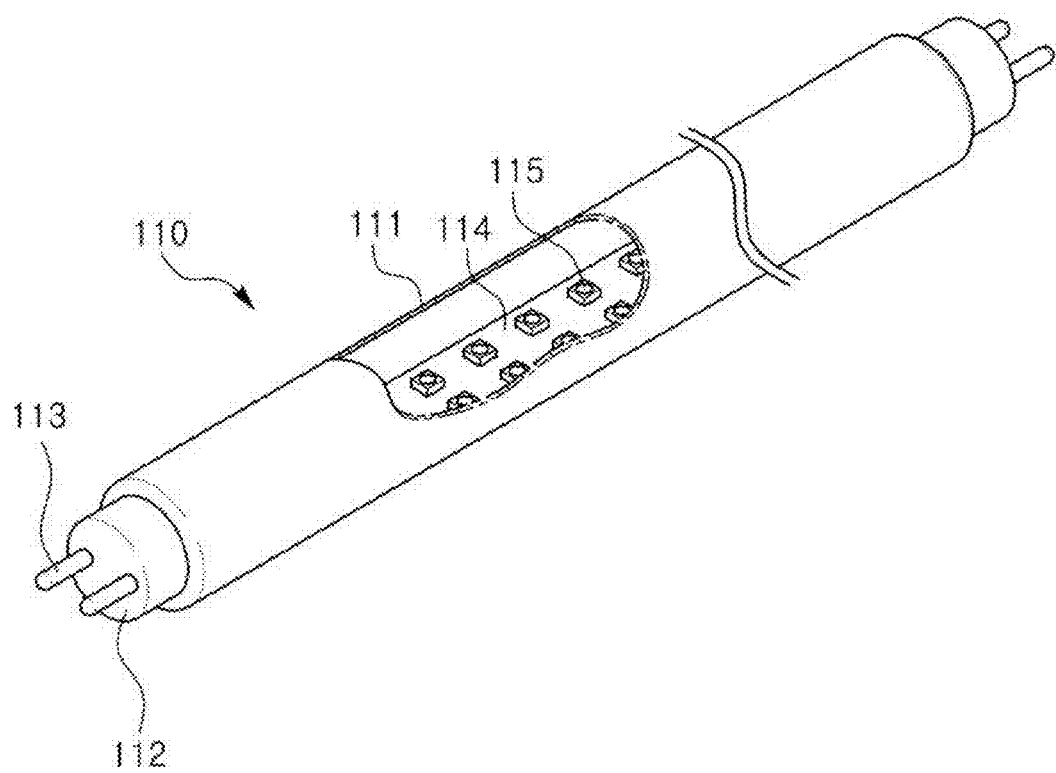
FIG. 2 is a perspective view illustrating an LED lamp diffuser according to an embodiment of the present invention, the LED lamp diffuser being applied to a fluorescent lamp type LED lamp.
Figure 3:
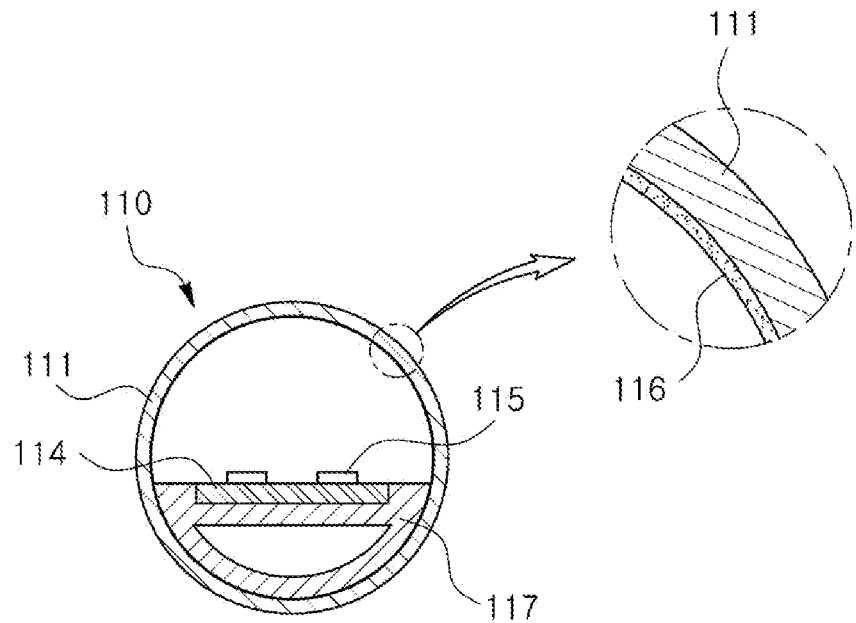
FIG. 3 is a cross-sectional view illustrating the LED lamp shown in FIG. 2.

As shown in FIGS. 2 and 3, a diffuser 116 according to an embodiment of the present invention is formed in such a manner to be applied to an inner surface of a glass tube 111 which is similar to a glass tube forming an existing typical fluorescent lamp and has an elongated tubular shape having a circular cross-section.

An LED lamp 110 having an external appearance similar to the fluorescent lamp may be manufactured in such a manner that LEDs 115 are disposed inside the glass tube 111 and bases 112 having connection pins 113 are coupled to both longitudinal ends of the glass tube 111.

As in a typical LED lamp, the plurality of LEDs 115 are mounted on a substrate 114 to be connected to the connection pins 113 through the substrate 114.

When the connection pins 113 are connected to power terminals of a typical lighting fixture and power is supplied to the LEDs 115, the LEDs 115 emit light. In this case, light of each LED 115 is diffused while penetrating the diffuser 116 applied to the glass tube 111, so that lighting is uniformly performed without glare.

In addition, heat generated by operation of the LED 115 may be radiated to the outside through the glass tube and the diffuser 116.

To effectively radiate the heat, a heat transfer medium 117 made of a typical material such as metal or silicon having high thermal conductivity may be provided between a back surface portion of the substrate 114 and an inner peripheral surface of the glass tube 111.

Meanwhile, the shape of the glass tube 111 is exemplarily illustrated in the drawing. However, the glass tube 111 may have various tubular shapes such as a U-shape, an L-shape, a curved shape, and a circular shape in addition to the linear shape, such that a connection means of the LED lamp is connected to one side or two or more ends of a typical lighting fixture having various structures. In addition, the glass tube may have another shape besides the tubular shape so as to be used for a bulb type LED lamp 120 shown in FIG. 4, and the bulb type LED lamp 120 may also be formed by applying and coating a diffuser onto an inner peripheral surface of a glass bulb 121 having various shapes.

Figure 4:
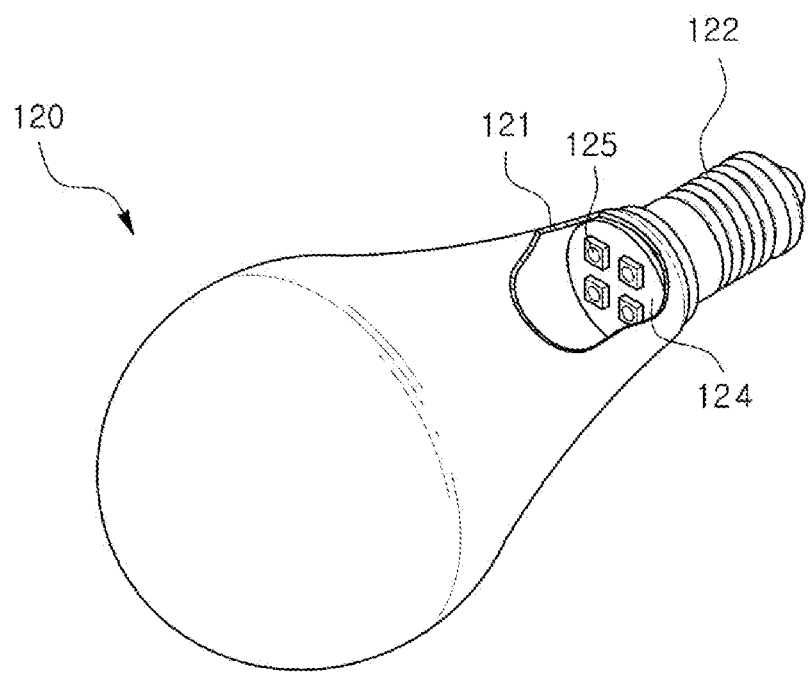
FIG. 4 is a perspective view illustrating an LED lamp diffuser according to another embodiment of the present invention, the LED lamp diffuser being applied to a bulb type LED lamp.

The LED lamp 120 in FIG. 4 has a structure in which a base 122 for power connection is coupled to one side of a bulb type diffuser 121 and a plurality of LEDs 125 are arranged on a substrate 124 in the inside of the LED lamp. In the following description, the diffuser will be designated only by reference numeral "116".

The diffuser 116 is composed of a coating composition configured as follows so as to satisfy physical and chemical properties such as light transmittance, chromaticity, haze, heat resistance, and strength which are required for the diffuser 116.

Here, a haze value is expressed by converting a value obtained by dividing diffuse transmittance by total transmittance into a percentage. The haze value being increased means that there is a greater amount of scattered light by diffusion without transmittance via direct light from a light source.

Thus, the haze value being of 100% means that light transmittance is entirely performed through diffusion, which is preferably suitable for a diffuser material for a lamp.

On the contrary, parallel transmittance is expressed as a value obtained by subtracting diffusion transmittance from total transmittance, meaning transmittance via direct-light. The higher the parallel transmittance is, the more the glaring via direct-light is, which means it is not suitable for a material for a lamp.

Further, it is appropriate for a material for a lamp to have a total transmittance of 50 to 85%, because too low total transmittance, obtained by a short distance between an LED source and a diffuser plate, causes light intensity to be reduced, whereas higher total transmittance causes internal light source devices and modules themselves to be viewed.

Since a diffuser may ideally perform its function when the haze value and the parallel transmittance are respectively kept constant, a coating composition for an LED lamp diffuser ideally satisfying the conditions on the haze value and transmittance, a manufacturing method thereof, and a color-coated glass article formed using the method will now be described.

In the present invention, a color coating composition includes a binder solution, glass frits, ceramic filler, and an inorganic pigment in a specified composition ratio.

The color coating composition may include 50 wt % of a binder solution, 40 wt % to 44 wt % of glass frits, 5 wt % to 8 wt % of ceramic filler, and 1 wt % to 3 wt % of an inorganic pigment.

The inorganic pigment may comprise any one selected from the group including C.I. Pigment Red 108, Cadmium zinc sulfide, C.I. Pigment Green 50, and C.I. Pigment Blue 28.

The inorganic pigment may have a content of 1 wt % to 5 wt %.

The binder solution may be composed of an organic binder and a solvent, wherein the organic binder comprises any one selected from the group including nitrocellulose, acrylic resin, and ethyl cellulose, and wherein the solvent comprises one or more components selected from the group including toluene, acetone, isobutylacetate, butyl cellosolve, and xylene.

The glass frits may mainly comprise silicon dioxide, boron oxide, zinc oxide, and barium oxide.

The glass frits may mainly comprise 9 wt % to 17 wt % of silicon dioxide, 18 wt % to 20 wt % of boron oxide, 41 wt % to 46 wt % of zinc oxide, and 9 wt % to 17 wt % of barium oxide.

The glass frits may further comprise 1 wt % to 11 wt % of one or more components selected from the group including potassium oxide, sodium oxide, and aluminum oxide.

The ceramic filler may comprise one selected from the group including calcium carbonate, calcium oxide, calcium fluoride, titanium dioxide, silica dioxide, zinc oxide, aluminum oxide, and magnesium oxide.

The ceramic filler may have a content of 8 wt % to 12 wt % according to a composition ratio of the glass frits.

The color coating composition may preferably have composition ratios shown in Tables below, which may induce optical results.

These composition ratios may correspond to composition conditions that, when considering a thermal glass transition temperature of soda-lime glass being of about 620° C., satisfy the temperature conditions in that coating should be performed at a temperature below the glass transition temperature.

For example, in order to obtain a color coating composition that is coated on glass using an organic binder so as to have higher haze and transmittance than reference values while preventing deformation of glass during calcination, compositions of glass frits and ceramic filler are very important. The color coating compositions have their compositions for satisfying such composition conditions.

Figure 5:
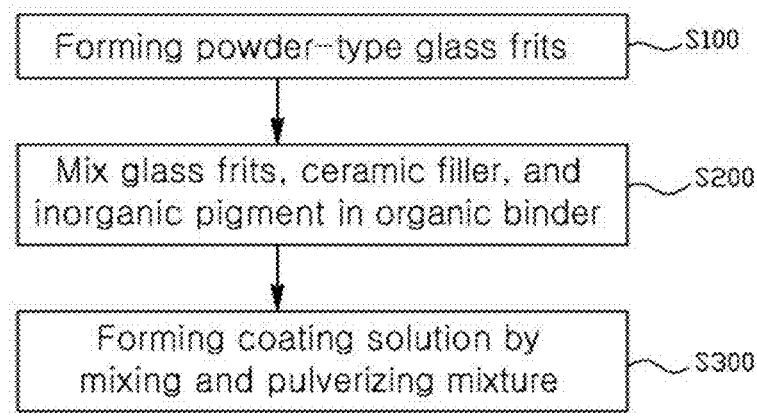
FIGS. 5 and 6 are block diagrams showing a method of manufacturing a coating composition for an LED lamp diffuser according to the present invention.

As shown in FIG. 5, a method of manufacturing such a color coating composition includes: (1) forming glass frits in the form of powders (S100); (2) mixing glass frits, ceramic filler, and an inorganic pigment in a specified composition in an organic binder solution (S200); and (3) forming a coating solution by stirring a mixed solution obtained from the stage (2) while pulverizing the mixture (S300).

That is, the color coating composition of the present invention is manufactured using the above-mentioned compositions and method.

The stage (3) (S300) is carried out for 30 minutes in a ball mill provided in a mixer such that the particle size of the ceramic filler becomes 2 μm to 4 μm.

Figure 6:
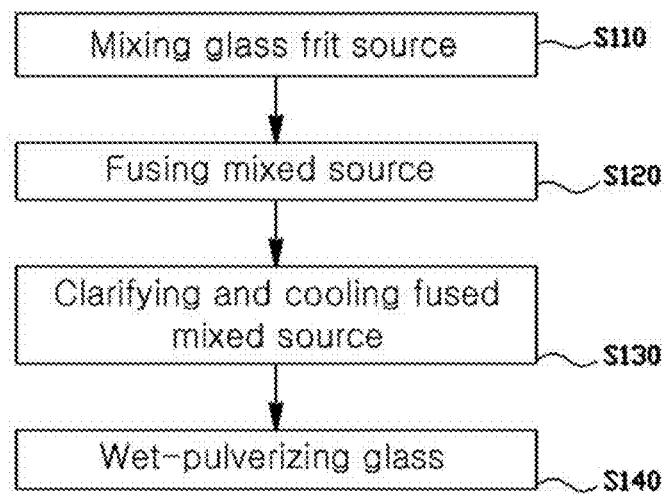

As shown in FIG. 6, the stage (1) (S100) in FIG. 5 includes mixing a glass frit source in a specified composition to form a mixed source (S110), fusing the mixed source using a fusing crucible (S120), clarifying and cooling the fused mixed source (S130), and wet-pulverizing the glass obtained from the clarifying and cooling processes (S140).

It is preferred that the fusing stage (S120) be carried out at 1200° C. for 30 minutes and the wet-pulverization stage (S140) be performed such that the particle size of the glass frits becomes 2 μm to 4 μm.

For example, according to the manufacturing method of the present invention, the ceramic filler, glass frits, and the inorganic pigment are mixed in the organic binder solution in such a manner that the glass frits are first prepared and then the inorganic pigment and the ceramic filler are mixed in the organic binder solution. The compositions of the glass frits are shown in Table 1 below.

TABLE 1

| Items | Examples of Compositions (wt %) | | | | | |
|---|---|---|---|---|---|---|
| | a | b | c | d | e | f |
| $SiO_2$ (wt %) | 17 | 9 | 13 | 15 | 17 | 16 |
| $B_2O_3$ (wt %) | 20 | 20 | 20 | 18 | 18 | 19 |
| ZnO (wt %) | 42 | 42 | 46 | 42 | 42 | 41 |
| BaO (wt %) | 9 | 17 | 9 | 13 | 11 | 12 |
| $K_2O$ (wt %) | 3 | 3 | | | | |
| $Na_2O$ (wt %) | 8 | 8 | 11 | 11 | 11 | 11 |
| $Al_2O_3$ (wt %) | 1 | 1 | 1 | 1 | 1 | 1 |
| CTE ($\times 10^{-7}/°$ C.) | 87.3 | 92.3 | 88.4 | 90.8 | 87.1 | 90.4 |
| Transition Point (° C.) | 460 | 440 | 450 | 450 | 460 | 460 |
| Softening Point (° C.) | 500 | 480 | 480 | 480 | 500 | 490 |

Here, CTE indicates a thermal expansion coefficient that is a thermal expansion coefficient that is at a temperature ranging from 30° C. to 300° C. of a curve obtained by analyzing a specimen, which is formed by calcinating a press-formed glass frit powders to 500° C. and cutting it into a body of about 5 mm*5 mm*40 mm, using a dilatometer, while increasing ambient temperature at 5° C. a minute from room temperature. Here, in the resultant curve, a sharply-increased point and an infection point from an increase to a decrease are taken as a transition point and a softening point (Td Ts: a softening point in the dilatometer), respectively, for the measurement.

That is, since the color coating composition used in the present invention is treated with a high-temperature forming process, the color coating composition should be kept properly attached to the color-coated glass to be calcinated at high temperature (500° C. or more).

Thus, the composition of the glass frit satisfies such temperature conditions so that the glass frit can be kept attached to the glass surface at the high temperature conditions of Table 1 (above the temperature at which the organic binder is removed, the organic binder of the present invention being evaporated and removed above 450° C.), together with the ceramic filler and the inorganic pigment which are provided to regulate haze and transmittance).

As a result of measurement, Examples a, c, and f, excluding Example b, can be ideal Examples with respect to temperature distribution, and Example c can be determined as having ideal conditions enough to satisfy temperature conditions in all aspects of thermal expansion coefficient, the transition point, and the softening point. Further, respective Examples may have different compositions to satisfy temperature conditions depending on respective use conditions.

Based on such compositions of the glass frit, the color coating compositions used in the present invention were tested.

TABLE 2

| | Examples of Composition (wt %) | | | | | | | |
|---|---|---|---|---|---|---|---|---|
| Component | 1 | 2 | 3 | 4 | 5 | 6 | 7 | 8 |
| Organic Binder Solution | 40 | 40 | 40 | 40 | 40 | 40 | 40 | 40 |
| Glass Frit (c) | 48 | 48 | 50 | 48 | 57 | 50 | 48 | 52 |
| CaCO$_3$ | 12 | | | | | | | |
| CaO | | 12 | | | | | | |
| CaF$_2$ | | | 10 | | | | | |
| SiO$_2$ | | | | 12 | | | | |
| TiO$_2$ | | | | | 3 | | | |
| MgO | | | | | | 10 | | |
| Al$_2$O$_3$ | | | | | | | 12 | |
| ZnO | | | | | | | | 8 |

Table 2 shows exemplary compositions where the composition of the ceramic filler changes relative to compositions of the organic binder and glass frit (Example c).

Experimental Example 1

Based on Table 2, specimens were fabricated by preparing straight-type and bulb-type transparent glass tubes, coating a coating composition on an inner surface of the transparent glass tubes in a thickness of 10 μm by means of dip-coating or spray-coating, increasing ambient temperature at 5° C./min and respectively holding the temperature for 5 minutes, from room temperature to 570° C., and cooling the coating composition.

Color-coated specimens were fabricated by coating a coating solution shown in Table 3 below on the former prepared specimens.

The prepared specimens were tested with respect to haze and transmittance thereof by means of NSK500 Model from NIPPON DENSOHKU using measuring methods according to JIS K 7136 (ISO 14782) and JIS K 7361 (ISO 13468). Here, a visible ray used to measure the transmittance was of a wavelength of 555 nm. Table 4 shows test results.

TABLE 3

| | Examples of Composition (wt %) | | | | | | | |
|---|---|---|---|---|---|---|---|---|
| Component | 1 | 2 | 3 | 4 | 5 | 6 | 7 | 8 |
| Organic Binder Solution | 50 | 50 | 50 | 50 | 50 | 50 | 50 | 50 |
| Glass Frit (c) | 41 | 40 | 39 | 44 | 43 | 42 | 42 | 41 |
| Ceramic Filler | 8 | 8 | 8 | 5 | 5 | 5 | 4 | 4 |
| Inorganic Pigment Red (C.I. Pigment Red 108) | 1 | 2 | 3 | 1 | 2 | 3 | 4 | 5 |

Table 3 shows color coating solutions in which glass frit (Example c), the ceramic filler, and the inorganic pigment were added in different composition in the organic binder solution.

TABLE 4

| Test Items | 1 | 2 | 3 | 4 | 5 | 6 | 7 | 8 |
|---|---|---|---|---|---|---|---|---|
| Haze | 83.93 | 84.10 | 84.55 | 71.85 | 72.70 | 73.52 | 72.42 | 74.67 |
| Parallel Transmittance | 11.26 | 10.86 | 10.121 | 22.12 | 21.35 | 20.57 | 20.44 | 21.52 |
| Diffusion Transmittance | 58.79 | 57.45 | 55.38 | 56.45 | 56.85 | 57.12 | 57.22 | 57.12 |
| Total Transmittance | 70.05 | 68.31 | 65.50 | 78.57 | 78.20 | 77.69 | 78.13 | 75.15 |

As shown in Table 4, it could be seen that, as a result of measuring total transmittance and Haze with respect to specimens having a composition in which glass frit had the composition of Example c and the contents of the ceramic filler and the inorganic pigment changed, specimens belonging to Examples 1, 2, and 3 of Experimental Example 1 and having 8 wt % of ceramic filler showed best measurement results irrespective of the content of the inorganic pigment.

Thus, in a state where the content of the ceramic filler was fixed to 8 wt % and different kind of inorganic pigments were added in order to realize various colors, Experiment was performed in the same conditions as those described above with respect to the coating solution and specimen-manufacturing method.

Experimental Example 2

In experimental conditions, Experimental Example 2 used the same equipment as in Experimental Example 1, and a thickness coated on the glass surface was increased to 20 μm.

TABLE 5

| | | Comparative Examples | | | | |
|---|---|---|---|---|---|---|
| Items | | 1 | 2 | 3 | 4 | 5 |
| Organic Binder Solution | | 50 | 50 | 50 | 50 | 50 |
| Glass Frit (c) | | 40 | 39 | 39 | 39 | 39 |
| Ceramic Filler | | 10 | 8 | 8 | 8 | 8 |
| Inorganic Pigment | C.I. Pigment Red 108 | — | 3 | — | — | — |
| | Cadmium Zinc Sulfide | — | — | 3 | — | — |
| | C.I. Pigment Green 50 | — | — | — | 3 | — |
| | C.I. Pigment Blue 28 | — | — | — | — | 3 |
| Color | | White | Red | Yellow | Green | Blue |
| Test Items | Haze (%) | 85.90 | 84.55 | 84.64 | 83.24 | 81.73 |
| | Parallel Transmittance (%) | 9.25 | 10.12 | 10.06 | 11.15 | 12.36 |

TABLE 5-continued

| | Comparative Examples | | | | |
|---|---|---|---|---|---|
| Items | 1 | 2 | 3 | 4 | 5 |
| Diffusion Transmittance (%) | 56.36 | 55.38 | 55.42 | 55.36 | 55.28 |
| Total Transmittance (%) | 65.61 | 65.50 | 65.48 | 66.51 | 67.64 |

As were shown in Table 5, all of Comparative Examples 1 to 5 showed test results satisfying reference values for requirements of a lamp material, and in the case where the content of the ceramic filler was fixed and the content of the inorganic pigment was kept constant for each color, an optimal result was obtained in an aspect of designing more colors.

Based on Experimental Example 2, it could be seen that the transmittance and Haze of the color coating composition to be coated on the glass could be regulated by regulating the softening point via the composition of the glass frit according to the present invention.

Thus, when the glass surface is coated with the coating composition of the present invention which is formed using the contents of the ceramic filler and glass frit, Haze and transmittance can be satisfied to a respective desired level, and Haze and transmittance can be changed by the regulation of the composition of the glass frit and the ceramic filler and the coating thickness, so as to suit to consumers' tastes.

Figure 7:
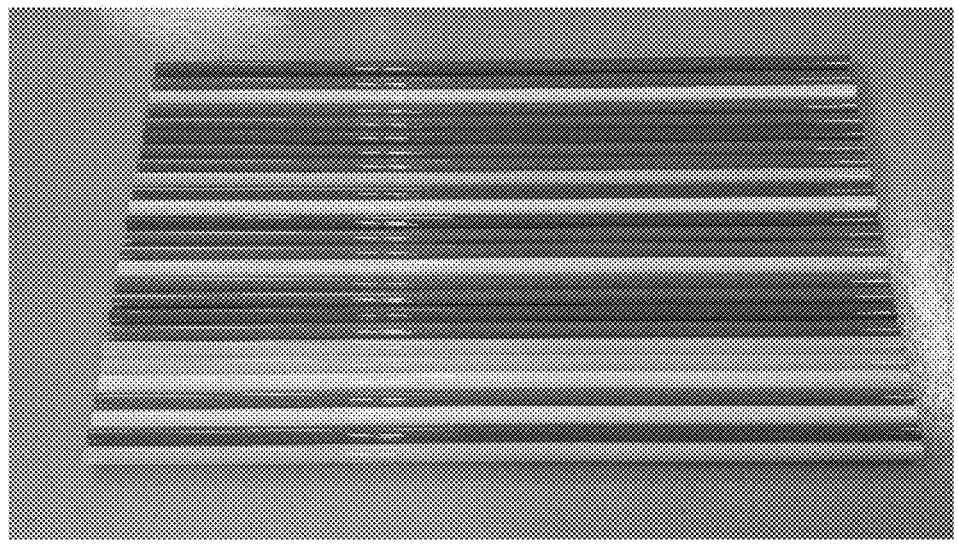
FIGS. 7 and 8 are photographs illustrating color-coated glass articles manufactured by the present invention.
Figure 8:
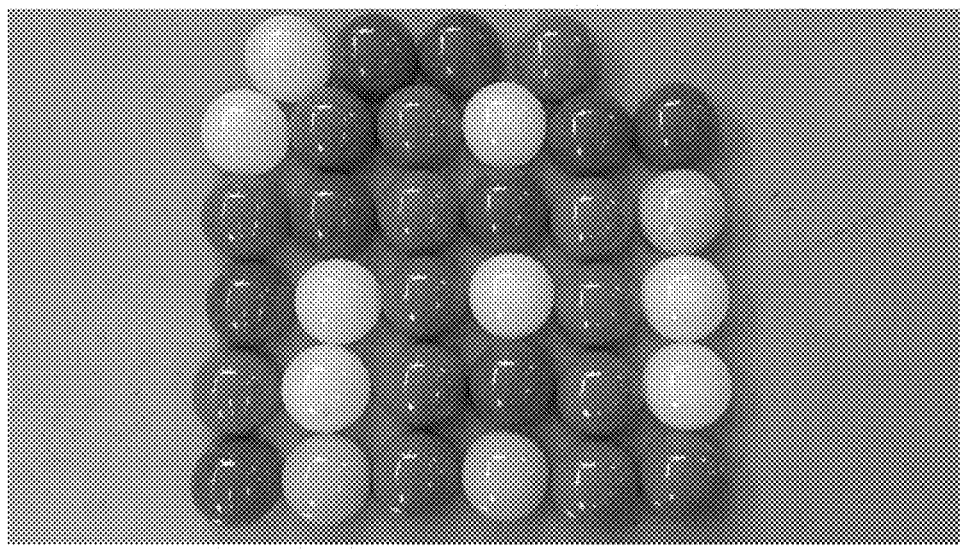

In addition to the glass frit and the ceramic filler, the inorganic pigment was added in order to realize various colors, so that as shown in FIGS. 7 and 8, the color-coated glass article having various colors can be fabricated.

Meanwhile, in another aspect of the present invention, there is provided a glass article coated with a coating composition for an LED lamp diffuser, wherein the coating composition is coated in a thickness ranging from 10 μm to 20 μm.

The color-coated glass article may be formed by increasing ambient temperature by 5° C. a minute and respectively holding the temperature conditions for 5 minutes from room temperature to 570° C. followed by a cooling and curing process. However, the ambient temperature may be increased to 500° C. This is because, considering that the organic binder solution of the composition is vaporized ort evaporated at about 450° C. and the thermal deformation temperature of glass is about 620° C., the temperature conditions correspond to those conditions capable of removing the organic binder solution while improving energy efficiency by temperature increase and attaching the coating components through calcination heat-treatment.

Although embodiments have been described with reference to a number of illustrative embodiments thereof, it should be understood that numerous other modifications and applications may be devised by those skilled in the art that will fall within the intrinsic aspects of the embodiments.

More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A color coating composition for an LED lamp diffuser, comprising:
   50 wt % of a binder solution, 39 wt % to 44 wt % of glass frits, 5 wt % to 8 wt % of ceramic filler, and 1 wt % to 5 wt % of an inorganic pigment,
   wherein the glass frits comprise 9 wt % to 17 wt % of silicon dioxide, 18 wt % to 20 wt % of boron oxide, 41 wt % to 46 wt % of zinc oxide, and 9 wt % to 17 wt % of barium oxide.

2. The color coating composition according to claim 1, wherein the inorganic pigment comprises any one selected from the group including C.I. Pigment Red 108, Cadmium zinc sulfide, C.I. Pigment Green 50, and C.I. Pigment Blue 28.

3. The color coating composition according to claim 2, wherein the inorganic pigment has a content of 1 wt % to 3 wt %.

4. The color coating composition according to claim 1, wherein the binder solution is composed of an organic binder and a solvent.

5. The color coating composition according to claim 4, wherein the organic binder comprises any one selected from the group including nitrocellulose, acrylic resin, and ethyl cellulose, and wherein the solvent comprises one or more components selected from the group including toluene, acetone, isobutylacetate, butyl cellosolve, and xylene.

6. The color coating composition according to claim 1, wherein the glass frits further comprise 1 wt % to 11 wt % of one or more components selected from the group including potassium oxide, sodium oxide, and aluminum oxide.

7. The color coating composition according to claim 1, wherein the ceramic filler comprises one selected from the group including calcium carbonate, calcium oxide, calcium fluoride, titanium dioxide, silica dioxide, zinc oxide, aluminum oxide, and magnesium oxide.

8. A color-coated glass article coated with a color coating composition for an LED lamp diffuser, wherein the color coating composition comprises a binder solution, glass frits, ceramic filler, and an inorganic pigment; and
   wherein the color-coated glass article is formed by increasing ambient temperature by 5° C. a minute and respectively holding the temperature conditions for 5 minutes from room temperature to 500° C. to 600° C. followed by a cooling and curing process.

9. The color-coated glass article according to claim 8, wherein the color coating composition is coated in a thickness ranging from 10 μm to 20 μm.

10. The color-coated glass article according to claim 8, wherein the color coating composition comprises 50 wt % of the binder solution, 39 wt % to 44 wt % of the glass frits, 5 wt % to 8 wt % of the ceramic filler, and 1 wt % to 5 wt % of the inorganic pigment, and
   wherein the glass frits comprise 9 wt % to 17 wt % of silicon dioxide, 18 wt % to 20 wt % of boron oxide, 41 wt % to 46 wt % of zinc oxide, and 9 wt % to 17 wt % of barium oxide.

11. The color-coated glass article according to claim 10, wherein the inorganic pigment comprises any one selected from the group including C.I. Pigment Red 108, Cadmium zinc sulfide, C.I. Pigment Green 50, and C.I. Pigment Blue 28.

12. The color-coated glass article according to claim 10, wherein the inorganic pigment has a content of 1 wt % to 3 wt %.

13. The color-coated glass article according to claim 10, wherein the binder solution is composed of an organic binder and a solvent.

14. The color-coated glass article according to claim 13, wherein the organic binder comprises any one selected from the group including nitrocellulose, acrylic resin, and ethyl cellulose, and wherein the solvent comprises one or more components selected from the group including toluene, acetone, isobutylacetate, butyl cellosolve, and xylene.

15. The color-coated glass article according to claim 10, wherein the glass frits further comprise 1 wt % to 1 1 wt % of one or more components selected from the group including potassium oxide, sodium oxide, and aluminum oxide.

16. The color-coated glass article according to claim 10, wherein the ceramic filler comprises one selected from the group including calcium carbonate, calcium oxide, calcium fluoride, titanium dioxide, silica dioxide, zinc oxide, aluminum oxide, and magnesium oxide.

17. A color-coated glass article coated with a color coating composition for an LED lamp diffuser, wherein the color coating composition comprises 50 wt % of a binder solution, 39 wt % to 44 wt % of glass frits, 5 wt % to 8 wt % of ceramic filler, and 1 wt % to 5 wt % of an inorganic pigment, and
wherein the glass frits comprise 9 wt % to 17 wt % of silicon dioxide, 18 wt % to 20 wt % of boron oxide, 41 wt % to 46 wt % of zinc oxide, and 9 wt % to 17 wt % of barium oxide.

18. The color-coated glass article according to claim 17, wherein the glass frits further comprise 1 wt % to 11 wt % of one or more components selected from the group including potassium oxide, sodium oxide, and aluminum oxide.

19. The color-coated glass article according to claim 17, wherein the inorganic pigment has a content of 1 wt % to 3 wt %.

20. The color-coated glass article according to claim 17, wherein the inorganic pigment comprises any one selected from the group including C.I. Pigment Red 108, Cadmium zinc sulfide, C.I. Pigment Green 50, and C.I. Pigment Blue 28.

* * * * *